(12) United States Patent
O'Neill et al.

(10) Patent No.: US 9,007,522 B1
(45) Date of Patent: Apr. 14, 2015

(54) SELECTIVELY ATTACHABLE AND REMOVABLE OPTICAL SYSTEMS FOR MOBILE DEVICES

(71) Applicant: olloclip, LLC, Huntington Beach, CA (US)

(72) Inventors: Patrick D. O'Neill, Huntington Beach, CA (US); Chong Pak, Lakewood, CA (US); Joshua Cantor, Huntington Beach, CA (US)

(73) Assignee: olloclip, LLC, Huntington Beach, CA (US)

( * ) Notice: Subject to any disclaimer, the term of this patent is extended or adjusted under 35 U.S.C. 154(b) by 0 days.

(21) Appl. No.: 14/497,165

(22) Filed: Sep. 25, 2014

Related U.S. Application Data

(60) Provisional application No. 61/883,088, filed on Sep. 26, 2013.

(51) Int. Cl.
*H04N 5/225* (2006.01)
*H04M 1/02* (2006.01)

(52) U.S. Cl.
CPC .................................. *H04M 1/0264* (2013.01)
USPC .......................................................... 348/375

(58) Field of Classification Search
USPC .......................................................... 348/373
See application file for complete search history.

(56) References Cited

U.S. PATENT DOCUMENTS

| | | |
|---|---|---|
| 971,798 A | 10/1910 | Somdal |
| D48,816 S | 4/1916 | De Ville |
| D138,816 S | 9/1944 | Glasser |
| D141,692 S | 6/1945 | Nemeth |
| 2,428,719 A | 10/1947 | Nemeth |
| D148,816 S | 2/1948 | Pemstein |
| 3,090,282 A | 5/1963 | Angenieux |
| 3,133,140 A | 5/1964 | Winchell |
| 3,138,060 A | 6/1964 | Eggert et al. |
| 3,454,323 A | 7/1969 | Dierks et al. |

(Continued)

FOREIGN PATENT DOCUMENTS

| | | |
|---|---|---|
| CN | 1797169 A | 7/2006 |
| CN | 201173987 Y | 12/2008 |

(Continued)

OTHER PUBLICATIONS

"4 in one Samsung Lens"; www.camera-licious.com; 2013.*

(Continued)

*Primary Examiner* — Gary C Vieaux
(74) *Attorney, Agent, or Firm* — Knobbe Martens Olson & Bear LLP

(57) ABSTRACT

Some embodiments disclosed herein relate to an optical system having multiple (e.g., two or more) optical components attached to a retainer portion, and the retainer portion may be removably attached to mobile electronic devices such as mobile phones, tablet computers, media players, and the like. In some embodiments, the optical components may be permanently or removably attached to the same face of the retainer portion. The optical system may be oriented in at least two different positions with respect to a mobile electronic device. In a first position, a first optical component may be generally aligned with an onboard camera of the mobile electronic device, and in a second position a second optical component may be aligned with the onboard camera.

19 Claims, 9 Drawing Sheets

(56) References Cited

U.S. PATENT DOCUMENTS

| | | | |
|---|---|---|---|
| 3,620,149 | A | 11/1971 | Ogihara |
| 3,680,461 | A | 8/1972 | Amesbury et al. |
| 3,796,489 | A | 3/1974 | Sone et al. |
| 3,817,601 | A | 6/1974 | Colaiace et al. |
| 3,828,991 | A | 8/1974 | Moore |
| D234,007 | S | 12/1974 | Ritter |
| D248,160 | S | 6/1978 | Feinbloom et al. |
| 4,264,167 | A | 4/1981 | Plummer |
| 4,305,386 | A | 12/1981 | Tawara |
| D264,048 | S | 4/1982 | Magner |
| D274,336 | S | 6/1984 | Huckenbeck |
| D274,691 | S | 7/1984 | Wallace |
| D275,766 | S | 10/1984 | Suzuki |
| D295,871 | S | 5/1988 | Charles |
| 4,760,510 | A | 7/1988 | Lahti |
| 4,864,333 | A | 9/1989 | Barber |
| 4,893,143 | A | 1/1990 | Sheng-Huei |
| 5,050,963 | A | 9/1991 | Murakami |
| 5,054,886 | A | 10/1991 | Ozaki et al. |
| 5,311,358 | A | 5/1994 | Pederson et al. |
| 5,416,544 | A | 5/1995 | Stapleton |
| 5,455,711 | A | 10/1995 | Palmer |
| 5,461,444 | A | 10/1995 | Okura et al. |
| D374,878 | S | 10/1996 | Palmer |
| D387,787 | S | 12/1997 | Palmer |
| 5,781,351 | A | 7/1998 | Murakami et al. |
| 5,831,778 | A | 11/1998 | Chueh |
| 6,545,825 | B2 | 4/2003 | Shoji et al. |
| 6,752,516 | B1 | 6/2004 | Beadle |
| 6,889,006 | B2 | 5/2005 | Kobayashi |
| 6,924,950 | B2 | 8/2005 | Gventer et al. |
| 6,967,790 | B2 | 11/2005 | Wei |
| D544,512 | S | 6/2007 | Hunag |
| D546,863 | S | 7/2007 | Ito et al. |
| D560,702 | S | 1/2008 | Tokiwa et al. |
| 7,600,932 | B2 | 10/2009 | Senba et al. |
| 7,604,423 | B2 | 10/2009 | Nagata et al. |
| 7,636,518 | B2 | 12/2009 | Tanaka et al. |
| 7,639,353 | B2 | 12/2009 | Rooke |
| 7,782,375 | B2 | 8/2010 | Chambers et al. |
| 7,967,513 | B2 | 6/2011 | Zhang |
| 8,000,589 | B2 | 8/2011 | Chan |
| 8,040,621 | B2 | 10/2011 | Chang et al. |
| D649,970 | S | 12/2011 | Lyford et al. |
| 8,073,324 | B2 | 12/2011 | Tsai |
| 8,279,544 | B1 | 10/2012 | O'Neill |
| D678,379 | S | 3/2013 | O'Neill et al. |
| D686,265 | S | 7/2013 | O'Neill et al. |
| 8,508,868 | B2 | 8/2013 | Weber et al. |
| D692,472 | S | 10/2013 | Samuels et al. |
| 8,593,745 | B2 | 11/2013 | O'Neill |
| D695,332 | S | 12/2013 | O'Neill |
| D697,957 | S | 1/2014 | Glasse et al. |
| D697,958 | S | 1/2014 | O'Neill et al. |
| D699,275 | S | 2/2014 | Samuels et al. |
| D700,228 | S | 2/2014 | O'Neill et al. |
| 8,687,299 | B1 | 4/2014 | Sandford et al. |
| D708,652 | S | 7/2014 | Hyers |
| D708,653 | S | 7/2014 | Hyers |
| 8,891,187 | B2 | 11/2014 | O'Neill |
| 2004/0218081 | A1 | 11/2004 | Lohr et al. |
| 2005/0088612 | A1 | 4/2005 | Smith et al. |
| 2007/0053682 | A1 | 3/2007 | Chang |
| 2007/0196090 | A1 | 8/2007 | Kubo |
| 2007/0275763 | A1 | 11/2007 | Sawadski et al. |
| 2007/0280677 | A1 | 12/2007 | Drake et al. |
| 2009/0109558 | A1* | 4/2009 | Schaefer .................. 359/827 |
| 2009/0181729 | A1 | 7/2009 | Griffin, Jr. et al. |
| 2010/0048243 | A1 | 2/2010 | Fourquin et al. |
| 2010/0328420 | A1 | 12/2010 | Roman |
| 2011/0043683 | A1 | 2/2011 | Beach et al. |
| 2011/0110654 | A1 | 5/2011 | Maki |
| 2012/0157160 | A1 | 6/2012 | Ozcan et al. |
| 2012/0236425 | A1* | 9/2012 | O'Neill ..................... 359/827 |
| 2013/0028591 | A1 | 1/2013 | Hicks |
| 2013/0094846 | A1* | 4/2013 | Apter ....................... 396/419 |
| 2014/0071547 | A1* | 3/2014 | O'Neill et al. ............. 359/827 |
| 2014/0253789 | A1 | 9/2014 | O'Neill et al. |
| 2014/0267882 | A1 | 9/2014 | O'Neill et al. |
| 2014/0320987 | A1 | 10/2014 | O'Neill et al. |

FOREIGN PATENT DOCUMENTS

| | | |
|---|---|---|
| JP | 2004-191897 | 7/2004 |
| JP | 2006-251150 | 9/2006 |
| JP | 2007-206137 | 8/2007 |
| KR | 10-0842373 | 7/2008 |
| WO | WO 2006/002674 | 1/2006 |
| WO | WO 2012/082738 | 6/2012 |
| WO | WO 2012/128936 | 9/2012 |
| WO | WO 2014/043266 | 3/2014 |

OTHER PUBLICATIONS

Julie Streitelmeier; "Use your 37mm DSLR lenses with your Samsung Galaxy S4"; the-gadgeteer.com; Jun. 9, 2013.*

"Olloclip for Andriod?"; xda-developers.com; user entry dated Jul. 22, 2013.*

"Universal Smart Phone Camera Lens Kit"; Amazon, Customer Review entry dated Jan. 27, 2013.*

Design U.S. Appl. No. 29/448,791, filed Mar. 13, 2013, O'Neill et al.
Design U.S. Appl. No. 29/448,792, filed Mar. 13, 2013, O'Neill et al.
Design U.S. Appl. No. 29/448,799, filed Mar. 13, 2013, O'Neill et al.
Design U.S. Appl. No. 29/469,842, filed Oct. 15, 2013, O'Neill et al.
Design U.S. Appl. No. 29/473,454, filed Nov. 21, 2013, O'Neill et al.
Design U.S. Appl. No. 29/473,455, filed Nov. 21, 2013, O'Neill et al.
Design U.S. Appl. No. 29/473,456, filed Nov. 21, 2013, O'Neill et al.
Design U.S. Appl. No. 29/478,914, filed Jan. 9, 2014, O'Neill et al.
Design U.S. Appl. No. 29/482,575, filed Feb. 19, 2014, O'Neill et al.
Design U.S. Appl. No. 29/487,839, filed Apr. 11, 2014, O'Neill et al.
Design U.S. Appl. No. 29/492,726, filed Jun. 2, 2014, O'Neill et al.
Design U.S. Appl. No. 29/492,734, filed Jun. 2, 2014, O'Neill et al.
Design U.S. Appl. No. 29/494,382, filed Jun. 19, 2014, O'Neill et al.
Design U.S. Appl. No. 29/498,470, filed Aug. 4, 2014, O'Neill et al.

amazon.com, "Fish Eye lens + Wide Angle Lens + Macro Lens 3-in-1 Kit for iPod iPhone 4g," [Customer Reviews included] printed Feb. 3, 2012 in 10 pages.

Focal, "Auxiliary Lens Set for Kodak Disc Camera", circa 1980s (photograph).

International Search Report and Written Opinion in PCT Application No. PCT/US2012/027888 dated Jul. 19, 2012.

kickstarter.com, "Glif—iPhone 4 Tripod Mount & Stand", http://www.kickstarter.com/projects/danprovost/glif-iphone-4-tripod-mount-and-stand, Oct. 3, 2013 [Selected screenshots from video].

* cited by examiner

SELECTIVELY ATTACHABLE AND REMOVABLE OPTICAL SYSTEMS FOR MOBILE DEVICES

RELATED APPLICATION

This application claims the benefit of U.S. Provisional Patent Application No. 61/883,088, filed on Sep. 26, 2013 and entitled "SELECTIVELY ATTACHABLE AND REMOVABLE OPTICAL SYSTEMS FOR MOBILE DEVICES," the entire contents of which is hereby incorporated by reference herein and made part of this specification for all that it discloses.

BACKGROUND

1. Field of the Invention

This invention relates generally to accessories for mobile devices (e.g., mobile telephones, mobile texting devices, personal media players, tablet devices, laptop computers, desktop computers, gaming devices, and/or devices capable of linking electronically to another device or to a network such as the Internet, etc.), and specifically to removable functional components for mobile devices.

2. Description of the Related Art

In recent years, many advances in computer networking and processing technology have made it possible for mobile devices to include cameras that permit users to capture images. In many cases, these images can be stored, processed, and transmitted. However, there are many design constraints on onboard cameras in mobile devices that can limit the weight, size, expense, shape, adjustability, and overall quality of the lensing systems of such cameras. Consequently, many cameras in mobile devices are inadequate for a wide variety of photographic needs and may produce lower quality photographic images. These deficiencies cannot be addressed by existing modular or detachable lensing systems for use with conventional film or digital cameras due to significant differences between such lensing systems and mobile devices, including incompatibilities in attachment structures, weight, optics, size, transportation, storage, ergonomics, and/or portability.

BRIEF DESCRIPTION OF THE DRAWINGS

Certain embodiments of the inventions will now be discussed in detail with reference to the following figures. These figures are provided for illustrative purposes only, and the inventions are not limited to the subject matter illustrated in the figures.

DETAILED DESCRIPTION

The following detailed description is now directed to certain specific examples of embodiments of the disclosure. In this description, reference is made to the drawings wherein like parts are designated with like numerals throughout the description and the drawings. The inventions are not limited to the examples expressly illustrated or described in this specification. Any structure, material, function, method, or step illustrated or described in connection with any embodiment in this specification can be used instead of or in combination with any other structure, material, function, method, or step illustrated or described in connection with any other embodiment in this specification.

Figure 1A:
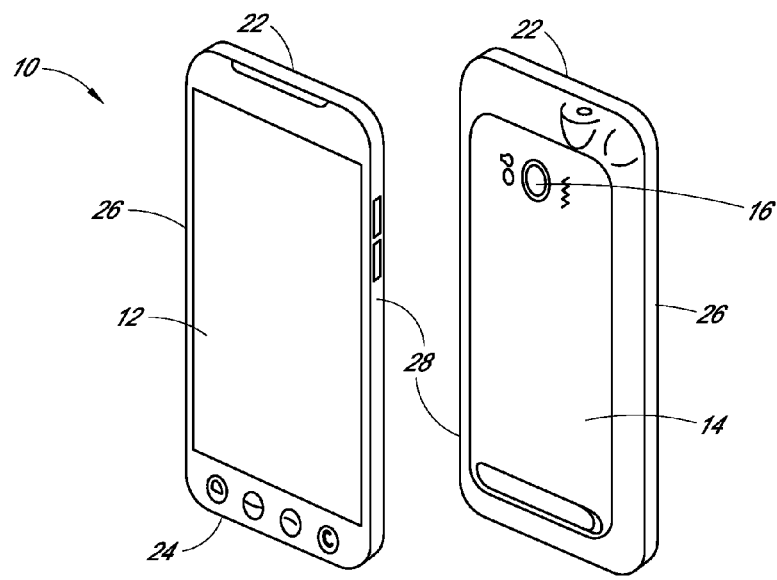
FIG. 1A illustrates an example of a mobile device with an onboard camera that is positioned at or near a generally vertical line that generally bisects the mobile device from top to bottom.

FIG. 1A illustrates two views of an example of a mobile device 10 with which a selectively attachable and removable optical system may be used. The mobile device 10 may be any electronic device configured to capture images, such as a mobile phone, media player, portable gaming device, tablet computer, or the like. For example, the mobile device 10 illustrated in FIG. 1A is a sample of the Galaxy line of mobile phones manufactured by Samsung. However, the present disclosure is not limited to any single type of mobile device or form factor.

The mobile device 10 may include two generally parallel, generally planar faces, such as a front face 12 and a rear face 14. The mobile device 10 may also have multiple edges such as a top edge 22, bottom edge 24, left edge 26 and right edge 28 (when viewing the front face 12 of the mobile device 10). As shown, the mobile device 10 includes an onboard camera lens 16 that is centrally located on a face of the mobile device in a horizontally central region that is positioned generally about the same distance from the left and right edges 26, 28 of the mobile electronic device, such as along or near a generally vertical line that generally bisects the mobile device 10 from top to bottom. For example, in some embodiments, the onboard camera lens 16 may be centrally located on the rear face 14 between two generally parallel edges 26 and 28 (e.g., left and right edges, respectively, when viewing the rear face 14 of the device 10). In some embodiments, as illustrated, the onboard camera is located near or adjacent to the top edge 22 and spaced substantially farther from the bottom edge 24 than from the top edge 22. Although specific example placements of the onboard camera lens 16 are shown and described, the examples are illustrative only, and are not intended to be limiting. In some embodiments the camera lens 16 may be located in other regions, such as about equidistant from both the top edge 22 and the bottom edge, substantially farther from the top edge 22 than the bottom edge 24, etc.

Figures 1B, 1C:
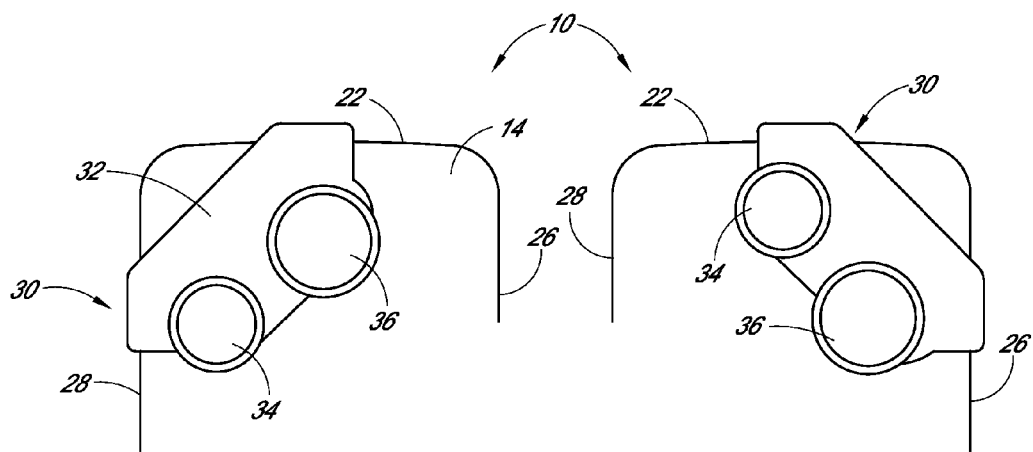
FIG. 1B illustrates an example of the mobile device of FIG. 1A with a removably attachable optical system attached in a first position.
FIG. 1C illustrates an example of the mobile device of FIG. 1A with a removably attachable optical system attached in a second position.

FIGS. 1B and 1C illustrate an embodiment of a selectively attachable and removable optical system 30. The optical system 30 may be removably attached to the mobile device 10. In some embodiments, the optical system 30 can be sold separately, or provided together with a particular mobile device 10.

The optical system 30 may include one or more optical components, such as lenses (e.g., zoom lenses, polarizer lenses, lens color filters, fish-eye lenses, wide-angle lenses, anti-reflection lenses, anti-glare lenses, magnifiers, etc.), auxiliary cameras, and the like. Any reference to "lenses" or "optical components" (plural) in this specification or similar structures applies equally to a device with a singular lens or optical component, unless otherwise noted. In some embodiments, as shown, the optical system 30 may include multiple (e.g., two or more or in some cases only two) optical components 34 and 36. As shown, two or more adjacent optical components 34, 36 can be connected by a generally diagonally oriented, generally straight connecting region. Multiple optical components 34, 36 can be attached or configured to be attached to the same front or rear face 12, 14 of the mobile electronic device at the same time. In some embodiments (not shown), multiple optical components can be attached or configured to be attached to a front face 12 of the mobile electronic device, and multiple optical components can be attached or configured to be attached to a rear face 14 of the mobile electronic device, at the same time. The optical system 30 may include a retainer portion 32 to which the optical components 34, 36 may be mounted. Each of the multiple optical components can provide a different optical effect, such that the optical system is configured to provide a plurality of different optical effects for the mobile electronic device. The mount may be temporary or permanent, as described in greater detail below.

A user can select which of the optical components 34, 36 to position in front of the camera 16 of the mobile device 10 to achieve a desired photographic affect. In some embodiments, as shown, the optical system can be configured to attach to a mobile device at multiple different locations and/or orientations to provide multiple different optical effects. For example, the user may attach the optical system 30 to the mobile device 10 in a first position, shown in FIG. 1B. In this first position, optical component 36 is automatically positioned in a region generally covering or near the onboard camera 16 of the mobile device 10. As shown, in some embodiments, the retainer portion 32 is configured to contact the mobile electronic device in two spaced-apart regions, while exposing a corner portion of the rear face 14 of the mobile electronic device and/or without contacting, covering, or extending along a corner of the mobile device between such spaced-apart regions. In some embodiments, the optical component 36 may be aligned such that it is substantially co-axial with the onboard camera 16. In this way, the optical system 30 permits repeatable, adequately precise placement of an optical component 36 in a single attachment motion without requiring the user to adjust the location or structure of the optical system 30 or optical component 34 during attachment.

While the retainer portion 32 is in the first position, the other lens component 34 is positioned away from the onboard camera 16, such as closer to a first edge 28 of the mobile device 10 than the optical component 36, and closer to the first edge 28 than a generally parallel second edge 26 (e.g., closer to a left edge of the mobile device 10 than a right edge when viewing the rear face 14 of the mobile device 10), and lower vertically than the optical component 36 (e.g., closer to the bottom edge 24 than the optical component 36 is to the bottom edge 24). The retainer portion 32 can be attached to the mobile device 10 such that two converging edges 28 and 22 of the mobile device 10 will generally fit within channels created by attachment structures (not shown) of the retainer portion 32, as described in greater detail below. In some embodiments, the selectively attachable and removable optical system 30 does not contact any corner region of the mobile device 10 when the optical system 30 is removably attached to the mobile device 10. For example, as shown, the area in which the two converging edges 28 and 22 of the mobile device 10 generally converge may not be contacted by the retainer portion 32.

In the first position, shown in FIG. 1B, the optical component 36 can temporarily provide an enlarged, better focused, wider, spectrally modified, colored, clearer, filtered, or otherwise enhanced, altered, manipulable, or improved image for the onboard camera 16. The retainer portion 32 in this or any other embodiment can comprise one or more conveying structures (such as channels, tubes, wires, fiber optics, openings, grooves, etc.) to convey energy, indicators, and/or signals (e.g., light, such as visible or infrared light, acoustic sound waves, electricity, etc.) from the mobile electronic device through and/or around at least a portion of the optical system 30. A user may move the optical system 30 to a second position, shown in FIG. 1C. For example, the user may remove the optical system 30 from the mobile device and pivot the optical system such that the retainer portion 32 is generally aligned as shown in FIG. 1C. In some embodiments, the optical components are configured to change position only when the optical system 30 is removed from and reattached to the mobile electronic device in a different location and/or orientation. For example, the optical components may not be permitted to rotate with respect to the retainer portion 32 or any other portion of the optical system 30. Once the optical system 30 is removed from the mobile electronic device, the user may then advance the optical system 30 toward an edge 22 of the mobile device 10 to attach the optical system 30 to the mobile device 10 in a second position, as shown. In this second position, lens component 34 is positioned so that it may be used with the onboard camera 16. Optical component 36 is positioned away from the onboard camera 16, such as closer to the second edge 26 of the mobile device 10 than the generally parallel first edge 28 of the mobile device, and lower vertically than the optical component 34 (e.g., closer to the bottom edge 24 than the optical component 36 is to the bottom edge 24). In some embodiments, as shown, the optical components 34, 36 are attached or configured to be attached directly to the same integral or unitary structure (e.g., retainer portion 32) that is configured to attach directly to the mobile electronic device, and the optical components 34, 36 do not move (e.g., slide or rotate) with respect to the structure that attaches to the mobile electronic device, when the optical components 34, 36 are attached to the optical system 30. The optical component 34 may provide different image enhancements or modifications than the first optical component 36.

Figure 2A:
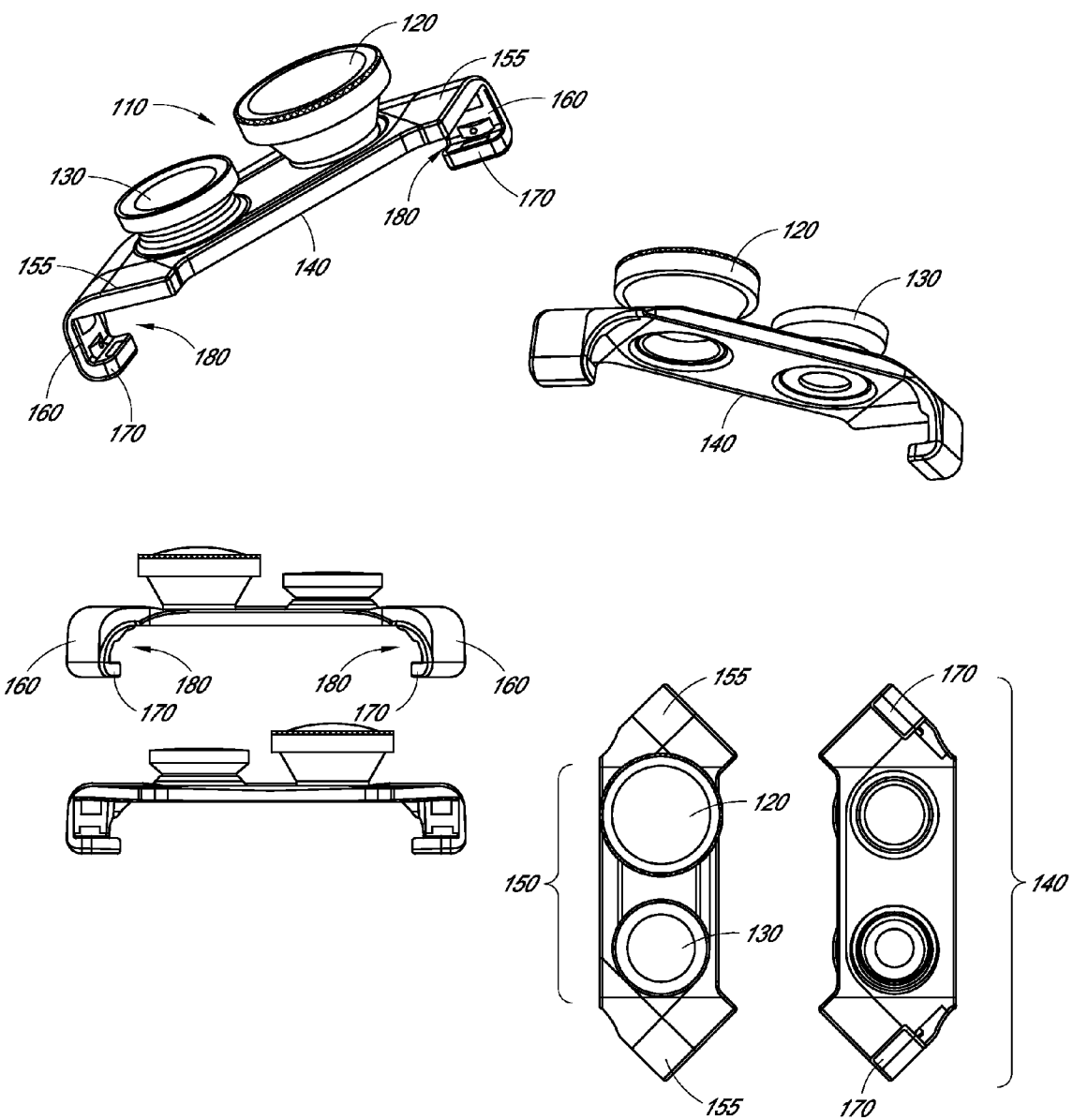
FIG. 2A illustrates an example of a removably attachable optical system in six different views.

FIG. 2A shows several different views of an example of a removably attachable optical system 110. The optical system 110 shown in FIG. 2A and described herein may be used with the mobile device 10 shown in FIG. 1A, or with some other mobile device. The optical system 110 may include one or more optical components for use with an onboard camera of a mobile device. The optical system 110 can function and be used in the same or generally the same manner as optical system 30.

In some embodiments, as illustrated, the optical system 110 can include multiple optical components 120, 130 and a retainer portion 140. The retainer portion 140 may include a body segment 150 and one or more end segments 155. The end segments 155 may be configured with attachment structures 160. In some embodiments, the attachment structures may include members 170 that form channels 180 between the members 170 and the corresponding end segments 155. For example, an attachment structure 160 with a member 170 may form a hook. In some embodiments, the end segments 155 may be arms, and a single optical system 110 may have at least two arms. Each arm may have a hooked portion configured to contact a second side of the mobile electronic device opposite the side of the mobile electronic device contacted by the body segment 150 (or a substantial portion thereof). As illustrated, in some embodiments, the arms can be fixed or stationary or lockable with respect to each other and/or with respect to the rest of the retainer portion 140; in some embodiments, the arms can swivel, pivot, or otherwise move with respect to each other or with respect to the rest of the retainer portion.

Optical components 120, 130 may be attached adjacent to one another on the body segment 150, extending outward from the body segment 150. End segments 155 may extend from opposite ends of the body segment 150 in generally the same plane as the body segment 150. In some embodiments, the end segments 155 may extend at an angle from the body segment 150, in generally the same plane as the body segment 150, in order to facilitate attachment of the retainer portion 140 to two generally converging edges of a mobile device as described in greater detail below.

The attachment structures 160 may extend from the end segments 155 in a direction opposite the direction in which the optical components 120, 130 extend from the body segment 150. This allows the attachment structures 160 to facilitate attachment of the optical system 110 to a mobile device without interference from the optical components 120, 130. Members 170 may extend from the ends of the attachment structures 160 at angles that define channels 180. In some embodiments, each channel 180 may be generally complimentary in shape to a portion of the mobile device which the channel 180 will receive during attachment of the optical system 110, as described in greater detail below.

The retainer portion 140 may be generally configured to be removably attachable to a mobile device such that, when attached, the retainer portion 140 will contact at least a first edge or surface and a second edge or surface of the mobile device. In some embodiments, the first edge and second edge may be generally converging. For example, the retainer portion 140 may contact a first generally horizontal edge of a mobile device, such as the top edge 22, and at least a second generally vertical and generally orthogonal edge, such as the left edge 28 or right edge 26 as shown in FIGS. 1B and 1C. When the retainer portion 140 is so attached to a mobile device, the converging outer edges of the mobile device may each fit within a respective channel 180. The end segments 155 may extend at an angle from opposite ends of the body segment 150 so that the channels 180 created by the attachment structures 160 and members 170 are positioned to generally align with the edges of the mobile device. The members 170 can partially or completely overhang on a portion of the mobile device (e.g., a front face) to facilitate securement of the retainer portion 140 to the mobile device. In some embodiments, as illustrated, the surface area of the retainer portion 140 that is configured to contact or generally cover the mobile electronic device is substantially less on the front side 12 than on the back side 14. For example, the width of a surface area of contact or coverage on the front side 12 can be about the same as or less than the thickness of a side edge of the mobile electronic device to which the retainer portion is configured to attach.

When the retainer portion 140 is attached to a mobile device, one of the optical components 120, 130 can be automatically positioned in a region generally covering or near an onboard camera lens of the mobile device that is centrally located or otherwise not substantially closer to a first corner than a second corner sharing an edge. For example, the onboard camera lens may be positioned at or near a generally vertical line that generally bisects the mobile device from top to bottom, and the retainer portion may be configured to automatically position an optical component 120 or 130 generally co-axial with the onboard camera lens. In this manner, the lens system 110 may enable the desired optical component 120 or 130 to cooperate optically with the onboard camera, to provide optical enhancements, improvements, modifications, and/or alternatives. Configured in this way, the optical system 110 can permit repeatable, adequately precise placement of the retainer portion 140, and therefore the optical components 120, 130, in a single attachment motion without requiring the user to adjust the location or structure of the retainer portion 140 during attachment. When the retainer portion is positioned such that one of the optical components (e.g., 120) may be used with the onboard camera, the other optical component (e.g., 130) is positioned away from the onboard camera. In some embodiments, the retainer portion 140 may comprise one or more recesses on the surface that contacts or faces the portion of the mobile device that includes the onboard camera lens. The one or more recesses may be sized, shaped, or otherwise configured to be generally complementary to a raised portion of the mobile device that generally surrounds or is generally adjacent to the onboard camera lens of the mobile device. The recess may receive or otherwise contact the raised portion of the mobile device and aid in alignment, securement, and stabilization of the retainer portion.

In some embodiments, the retainer portion 140 may comprise a single piece of material shaped as described above. In some embodiments, the retainer portion 140 may comprise a single body piece and two attachment structures, together taking substantially the same form as described above. In some embodiments, the retainer portion 140 may comprise several separate pieces as described above, each of which are affixed to one another. The multiple optical components 120, 130 can be attached to or positioned in the retainer portion 140 at a location that is configured to be adjacent to an edge region of the mobile electronic device when the retainer portion 140 is attached to the mobile electronic device. For example, either or both of the optical components 120, 130 can be configured to be positioned within a distance from an edge of a mobile electronic device, when attached, that is approximately the same as or less than the distance across the optical surface of either optical component 120, 130 (e.g., the same as or less than a diameter of a lens of either optical component 120, 130).

In some embodiments, at least a portion of the retainer portion 140 can be made of a material (e.g., a polymer or a silicone) that is sufficiently flexible to permit a degree of bending or stretching of one or more attachment structures 160 and/or members 170. When the retainer portion 140 is made of such a material, the channels 180 may be temporarily widened while sliding the optical system 110 onto a mobile device, but the retainer portion 140 may remain sufficiently stiff, rigid, or resilient to urge one or more of the attachment structures 160 or members 170 to return to its original position. In this manner, the retainer portion 140 may exert a gripping force against a portion of the mobile device. The material of the retainer portion 140, or some portion thereof (e.g., the region on the inner side of the attachment structures 160 and/or members 170 defining channels 180), can also be textured, tacky or otherwise somewhat slide resistant to enhance the gripping of the retainer portion 140 to the mobile device.

In some embodiments, the shape and/or size of the members 170 may be chosen to permit the retainer portion to stably attach to a mobile device without the members 170 obstructing or appreciably obstructing a user's view of a viewing portion of the mobile device. The shape and/or size of the attachment structures 160 together with the members 170 may be chosen such that they generally correspond to the shape of one or more edges of a mobile device. Additionally, the size and/or shape of the attachment structures 160 and the members 170 may be chosen to include one or more internal surface contours (not shown) configured to generally avoid interference with one or more external features on a mobile device (e.g., buttons, switches, contours, etc.). The width of the channels 180 may be configured to be generally complimentary to the thickness of a portion of the mobile device(s) on which the retainer portion 140 is configured to attach. In some embodiments, the natural width of the channel 180 is approximately the same size or slightly smaller than the thickness of an edge, such as an upper edge, of the outside housing of a mobile device near the light aperture of the onboard camera of the mobile device.

In some embodiments, the retainer portion 140 can permit the optical system 110 to be attached to a mobile device without requiring non-stock mounts on the mobile device and without requiring dynamic mounts on the retainer portion 140 itself (e.g., fasteners, screws, adjustable clamps, etc.). Thus, a user can attach the optical system 110 to a corner of a mobile device by simply sliding it, for example, onto the corner of the mobile device, and can remove it by simply pulling it off, without requiring user adjustment during attachment.

In some embodiments, the optical components 120, 130 may be either releasably coupled to or integrally formed with the body segment 150 of the optical system 110. Additionally, the optical system 110 can include one or more interior lens components, such as an embedded lens component beneath either or both of the optical components 120, 130. In some embodiments, multiple lenses can be configured to provide a variable optical magnification (e.g., a zoom feature) by permitting manipulation of the distance between the lenses, such as with a lever or rotating actuator (e.g., a thumb wheel). The body segment 150 or the embedded lens component can comprise a connection portion, such as a threaded portion. The threaded portion can facilitate removably attaching optical components, such as optical component 130, to the body segment 150.

In some embodiments, the optical components 120, 130 may attach to the retainer portion 140 such that the optical components 120, 130 may be adjusted with respect to a mobile device (e.g., azimuthally, along the optical component's vertical axis, along the component's horizontal axis, a combination of these adjustments, etc.). In some embodiments, the optical components 120, 130 may also attach to the retainer portion in such a way that the optical components 120, 130 may be tilted (e.g., attached to the retainer portion 140 by a ball and socket joint). The ability to adjust the optical components 120, 130 with respect to the mobile device 110 can be advantageous in addressing manufacturing differences or tolerances in the location and/or alignment of the onboard camera lenses in some mobile devices.

Figure 2B:
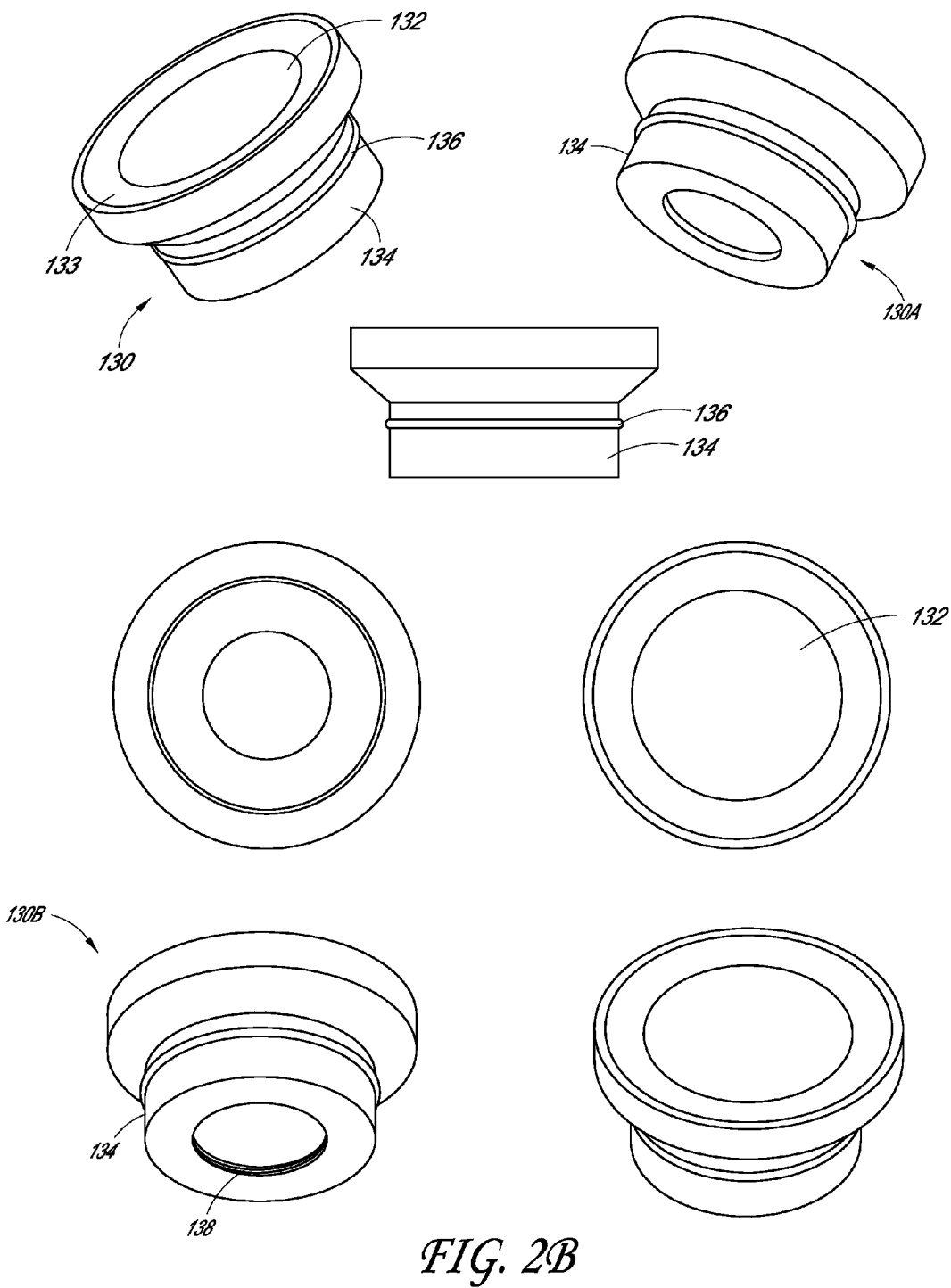
FIG. 2B illustrates an example of an optical component in seven different views.

FIG. 2B illustrates an example of an optical component 130A that may be used with a removably attachable optical system. In some embodiments, as illustrated, the optical component 130A may include a lens 132 and a base portion 134. The base portion 134 may include a securing structure 133 and a ridge 136 extending around the body of the base portion 134. The lens 132 may generally fit within the securing structure 133.

The optical component 130A may be attached to the retainer portion of an optical system, such as the optical system 110 illustrated in FIG. 2A, for use with an onboard camera of a mobile device. The lens component 130A may be selectively attachable and detachable from the retainer portion, or it may be integrally formed with the retainer portion. Additionally, the lens 132 may be selectively attachable to and detachable from the base portion 134.

In some embodiments, the base portion 134 of an optical component 130B may comprise threads 138 rather than a ridge 136 for attachment to the retainer portion of an optical system. For example, the optical component 130B may be screwed into an opening on a retainer portion. Other connection mechanisms for attaching an optical component 130A or 130B to a retainer portion of an optical system may be used, such as a bayonet mount or magnetic mount.

In some embodiments, the securing structure 133 and the base portion 134 can be configured to slide or otherwise move with respect to each other in a limited manner to allow for adjustment of the position of the lens 132 with respect to the onboard camera lens of a mobile device (e.g., for the purpose of addressing manufacturing tolerances in the location of the onboard camera lenses in some mobile devices).

The optical component 130A or 130B can include multiple lenses, lens filters, or other optical components. In some embodiments (not shown), the optical component 130A or 130B can comprise more complex lensing systems, such as lensing systems in which the focal length of the lensing system can be manually or electronically adjusted, such as with a lever or rolling dial or with electronic or motor control, which may be positioned between the lens 132 and the base portion 134. An electronic or motor control can be attached and adjusted using software in the mobile device. Other specialized lenses in the lensing system can include telephoto lens systems configured to enlarge images, wide-angle lenses, fish-eye lenses, and microscopic lenses. The lens 132 can also comprise coatings or other features to increase scratch resistance, diminish glare or reflection, or decrease or filter light transmitted through the lens 132.

Figure 3:
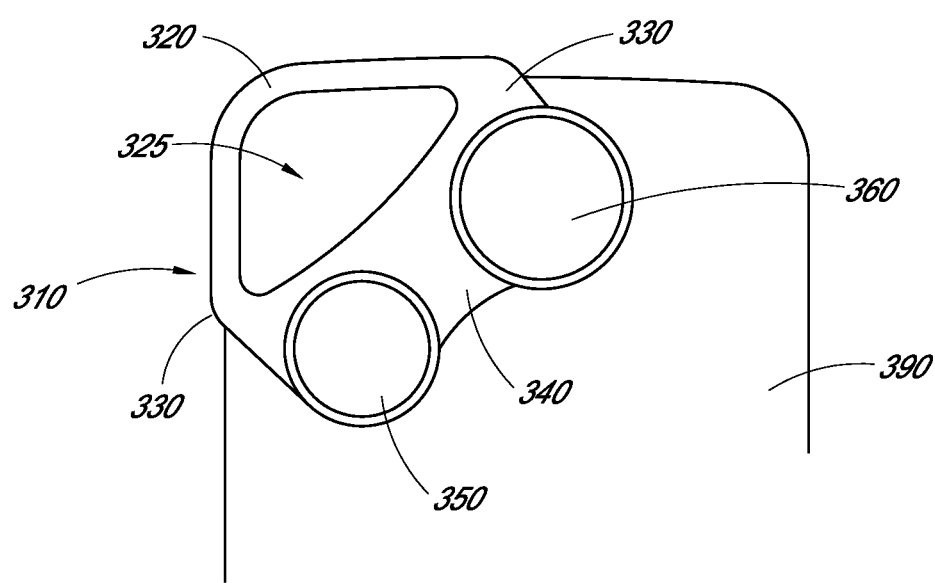
FIG. 3 illustrates an example of a removably attachable optical system attached to a mobile device.

FIG. 3 illustrates an embodiment of an optical system 310 positioned on a mobile device 390. In many respects, the optical system 310 is similar to the optical system 110 described above. The optical system 310 has a retainer portion 340 onto which multiple optical components 350, 360 may be attached. The retainer portion 340 has two end segments 330 and a curved upper wall 320. The retainer portion 340 may be shaped so that it exposes an area 325 of the mobile device 390 (e.g., in order to reduce the amount of material used to manufacture the lens system 310, to allow access to components of the device 390 that may be located in the area 325, etc.). The upper wall 320 may extend outward from the retainer portion 340 such that it connects the two end segments 330. The upper wall 320 can generally contact two converging edges of the mobile device 390 so as to permit a user to easily place the lens system 310 on the mobile device 390 without adjustment, automatically positioning one of the lens components 350, 360 in a region generally covering or near an onboard camera lens in the mobile device. The upper wall 320 may be shaped so as to generally conform to the shape of the outer boundary of the mobile device 390.

Figure 4:
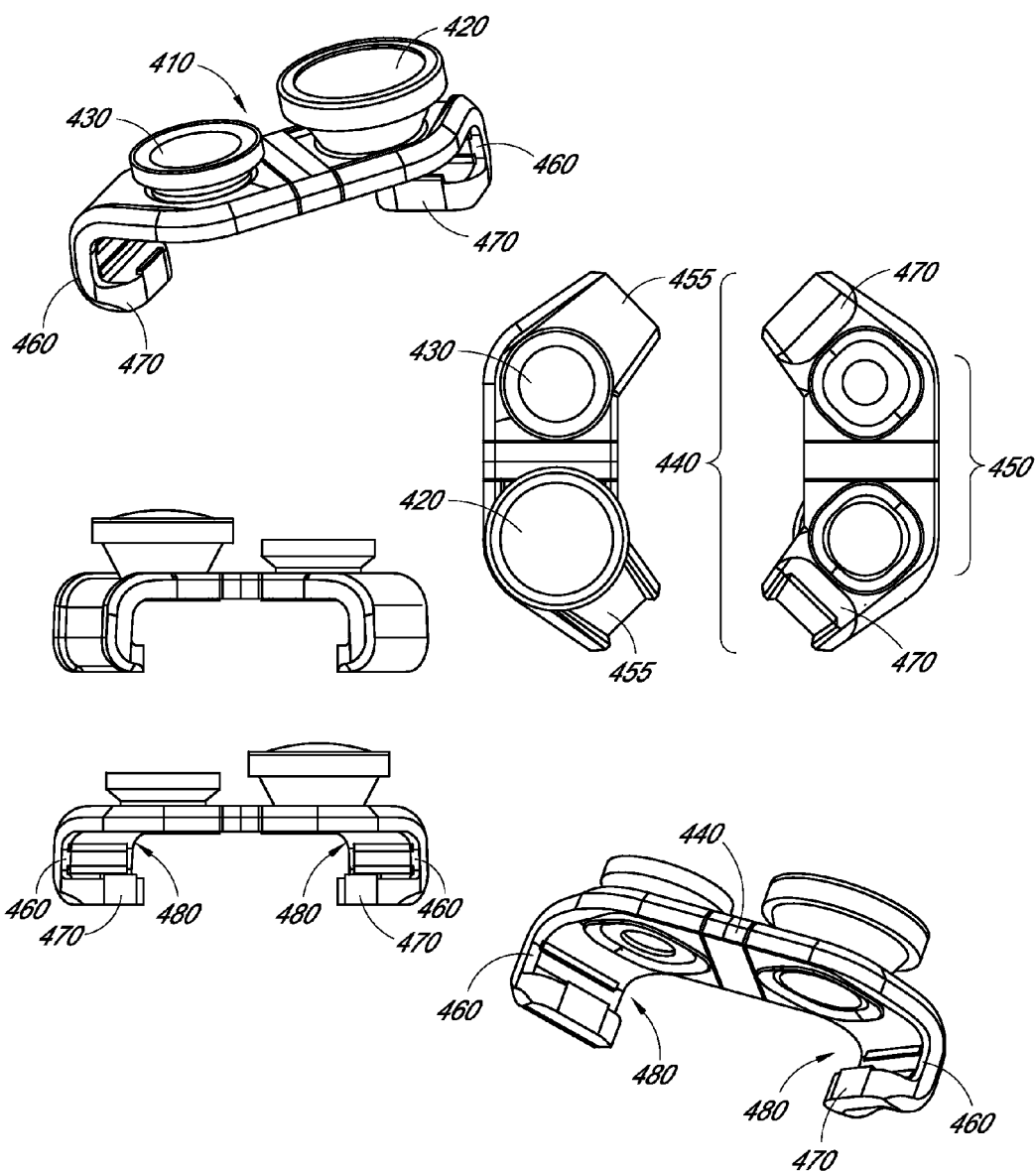
FIG. 4 illustrates six different views of an example of a removably attachable optical system.

FIG. 4 illustrates another example of a removably attachable optical system 410 in several views. The optical system 410 can include multiple optical components 420, 430 and a retainer portion 440. The retainer portion 440 may include a body segment 450, one or more end segments 455 and one or more attachment structures 460. One or more of the attachment structures 460 may include a member 470 that forms a channel 480 between the member 470 and the end segment 455. The segments 440 may extend at an angle from each end of the retainer portion 450.

In the optical system 410, the end segments 455 may extend at an angle from each end of the body segment 450 in the same plane as the body segment 450. The optical components 420, 430 may be affixed adjacent to one another partially atop the body segment 450 and partially atop each end segment 455, extending generally orthogonally therefrom. The attachment structures 460 may extend from the end segments 455 in a direction opposite the lens components 420, 430. The members 470 may extend from the ends of the attachment structures 460 at an angle (e.g., generally orthogonally) to create the two channels 480.

The optical system 410 may removably attach to a mobile device in substantially the same manner as described above for the optical system of FIG. 2A. As described above, one or both of the optical components 420, 430 may be replaced with a different optical component, such as a filter. Additionally, as described above, the retainer portion 440 may comprise a single piece of material or several, shaped in either case so that the optical system takes substantially the form described here.

Figure 5A:
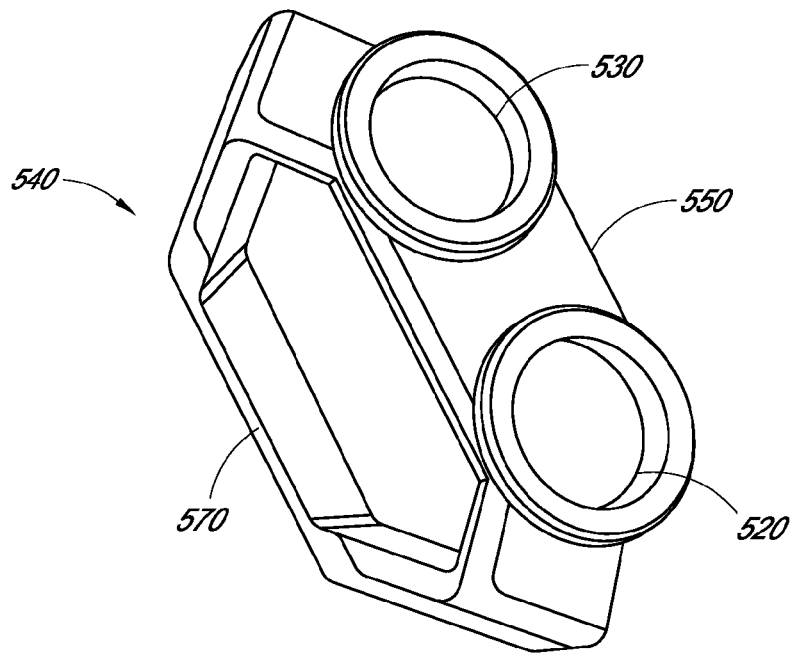
FIG. 5A illustrates an example of a removably attachable optical system with a single attachment structure.

FIG. 5A illustrates an optical system that may be identical or similar in some respects to the optical systems described above. The optical system may include a retainer portion 540. The retainer portion 540 may include a body segment 550 and one or more mounts for optical components, such as mounts 520 and 530. In some embodiments, any of the optical components described herein, such as the optical component 130 shown in FIG. 2B and described above, may be mounted to the retainer portion 540 via a mount 520 or 530. For example, a mount 520 may include a threaded aperture into which an optical component may be screwed, or the optical component may be press-fit into the mount. As another example, an optical component may be integrally formed with the retainer portion 540, such that a separate mount 520 or 530 is not necessary. Optical components may be mounted or otherwise affixed to the body segment 550 such that the optical components extend generally orthogonally from the body segment 550.

The retainer portion 540 may include a single attachment structure 570. The attachment structure 570 may extend from opposite ends of the body segment 550 and may be displaced from the plane of the body segment 550 in a direction opposite that of the optical components. The amount of displacement may generally correspond to a thickness or shape of a portion of a mobile device to which the optical system 510 is to be attached.

The retainer portion 540 may be removably attached to a mobile device in multiple positions to make use of the different optical components 520, 530 in substantially the same manner as described above. For example, the retainer portion 540 may be attached in a first position, and an optical component mounted to mount 530 may be automatically positioned generally over or near an onboard camera of the mobile device, or generally coaxial with the onboard camera. When the retainer portion 540 is attached in a second position, an optical component mounted to mount 520 may be automatically positioned generally over or near the onboard camera, or generally coaxial with the onboard camera.

When the retainer portion 540 is attached to a mobile device, the attachment structure 570 may be in contact with and/or extend around first and second generally converging edges of a mobile device, such as a top edge and a lateral edge. Additionally, when the retainer portion 540 is attached to a mobile device, the attachment structure 570 may come into contact with a first generally planar surface of the mobile device that is generally parallel to a second generally planar surface on which an onboard camera lens may be located. For example, the attachment structure 570 or some portion thereof may contact a front face of the mobile device, while an onboard camera lens may be located on, or accessible via, a rear face. In some embodiments, the body segment 550 or some portion thereof may contact the second generally planar surface.

In some embodiments, the retainer portion 540, or some portion thereof, such as the attachment structure 570, can be made of a material (e.g., a polymer or a silicone) that is sufficiently flexible to permit a degree of bending or stretching. When the retainer portion 540 or the attachment structure 570 is made of such a material, the amount of displacement between the attachment structure 570 and the body segment 550 may be temporarily increased while sliding the retainer portion 540 onto a mobile device. However, the retainer portion 540 or attachment structure 570 may remain sufficiently stiff, rigid, or resilient to generally return to its original position, thereby substantially resuming the original displacement between the attachment structure 570 and body segment 550. In this manner, the retainer portion 540 may exert a gripping force against a portion of the mobile device. The material of the retainer portion 540, or some portion thereof (e.g., the region on the inner side of the attachment structure and/or body segment 550), can also be tacky or somewhat slide resistant to enhance the gripping of the retainer portion 540 to the mobile device.

In some embodiments, the attachment structure 570 may be a single piece of molded material, or it may comprise multiple pieces affixed to one another such that their collective shape conforms to a portion of a mobile device. The size and/or shape of the attachment structure 570 may be chosen such that the attachment structure 570 does not obstruct or does not appreciably obstruct a user's view of a surface, such as the viewing screen, of a mobile device when the retainer portion 540 is attached to the mobile device.

Figure 5B:
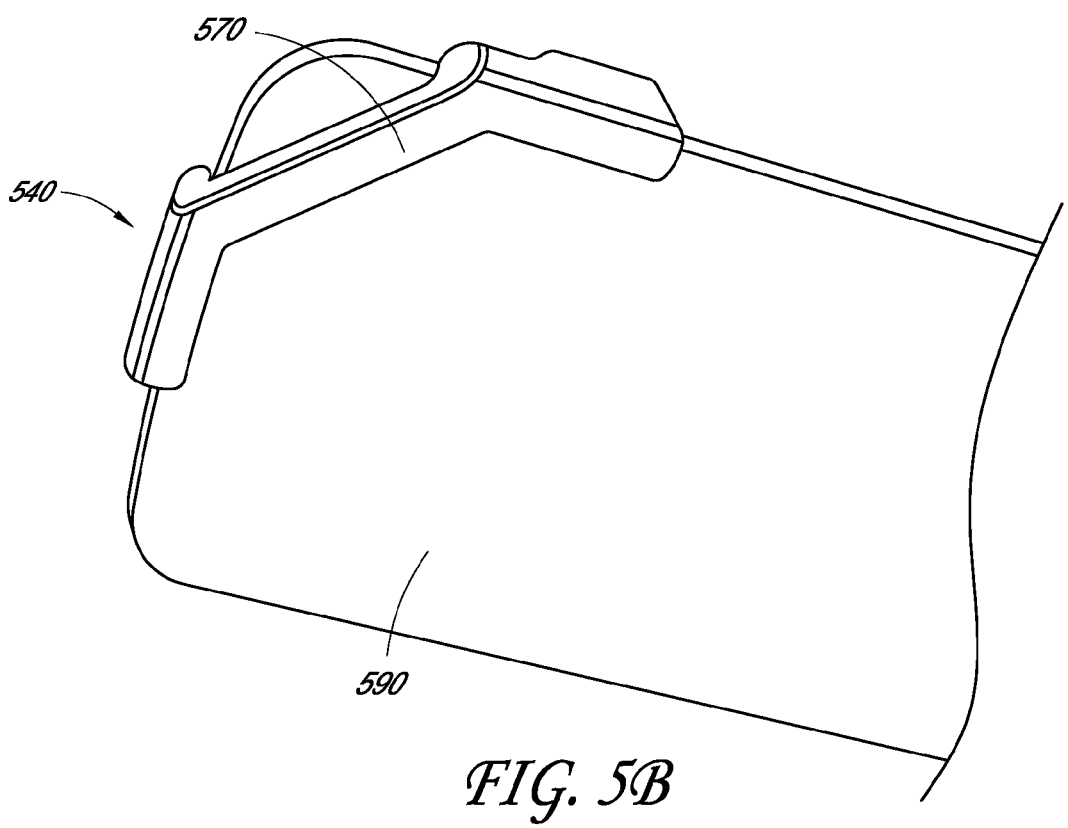
FIG. 5B illustrates an example of a mobile device on which the optical system of FIG. 5A has been attached.

As illustrated in FIG. 5B, when the optical system 510 is attached to a mobile device 590, the attachment structure 570 extends around the body of the mobile device 590. The attachment structure 570 may contact a generally planar surface of the mobile device 590 that is generally parallel or opposite that on which the onboard camera is located.

Figure 6:
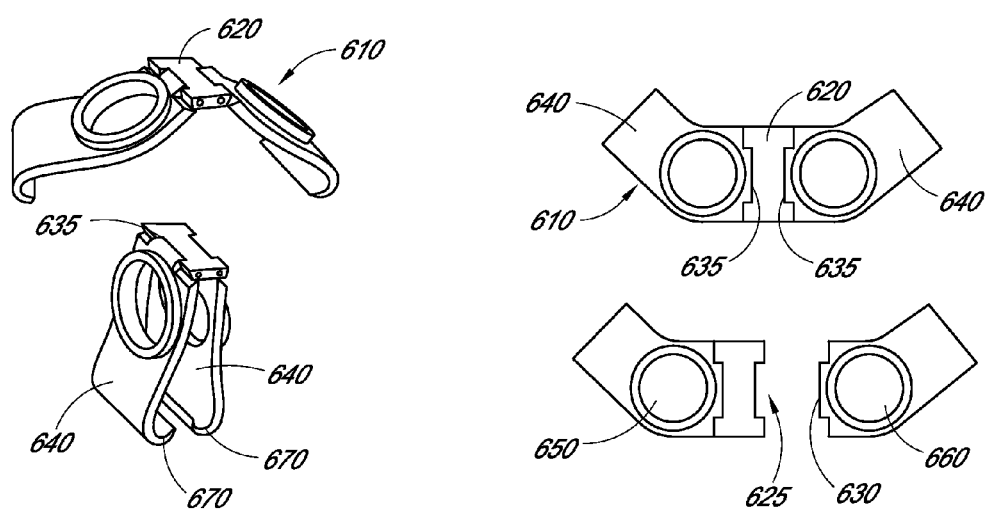
FIG. 6 illustrates an example of a removably attachable optical system that may be folded.

FIG. 6 illustrates several views of an example of an optical system 610 that has at least one joint such that the optical system 610 may be folded, bent, or otherwise transformed into a smaller or less elongate shape for ease of storage, transport, etc. In some embodiments, as illustrated, the optical system 610 may include optical components 650, 660, a center body segment 620, and end segments 640. The center body segment 620 may include a first connector, such as one or more female connectors 625. The end segments 640 may each include a second connector, such as a male connector 630 and an attachment structure 670. In some embodiments (not shown), the center body segment 620 may include one or more male connectors, and the end segments 640 may each include a female connector.

In the optical system 610, the optical components 650, 660 may each be attached to one of the end segments 640, extending generally orthogonally therefrom. The end segments 640 may be configured such that one attachment structure 670 is disposed at one end of each of the end segments 640. The end segments 640 may be further configured such that each end segment 640 has a male connector 630 located on the end opposite from the attachment structure 670. The end segments 640 may attach on either side of the center body segment 620, each creating a joint 635 between the male connector 630 of the end segment 640 and the female connector 625 of the center body segment 620. The joints 635 may allow the end segments 640 to move, independently from one another, with respect to the center body segment 620 and thus form an angle with the center body segment 620. In some embodiments, as illustrated, the end segments 640 each may be selectively attachable and detachable from center body segment 620 at the joint 635.

Figure 7:
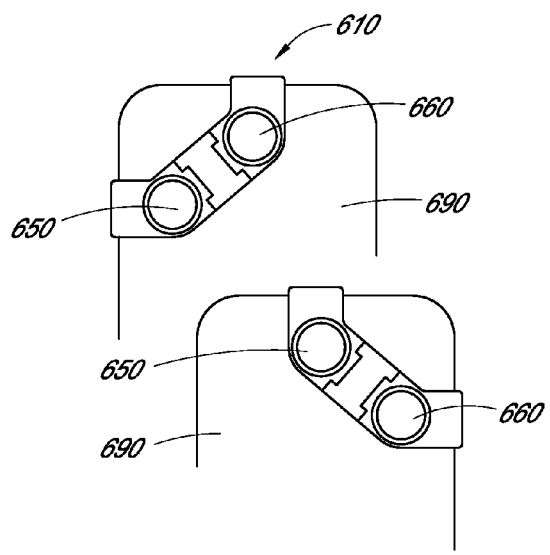
FIG. 7 illustrates an example of a mobile device with the optical system of FIG. 6 attached in two different positions.

As illustrated in FIG. 7, the optical system 610 of FIG. 6 may be attached to a mobile device 690 in multiple positions in order to make use of the different optical components 650, 660. The optical system 610 may be attached to the mobile device 690 in a first position so that the optical component 660 is positioned in a region generally covering or near an onboard camera lens in the mobile device 690 to enable the optical component 660 to cooperate optically with the onboard camera. When so positioned, the attachment structures 670 may generally fit around converging edges of the mobile device 690, thereby securing the lens system 610 to the mobile device 690 as described in detail above. While the optical system 610 is in this first position, the other optical component 650 is positioned away from the onboard camera. As illustrated, a user may move the optical system 610 to a second position such that the optical component 650 is positioned so that it may be used with the onboard camera while the optical component 660 is positioned away from the onboard camera.

Figure 8:
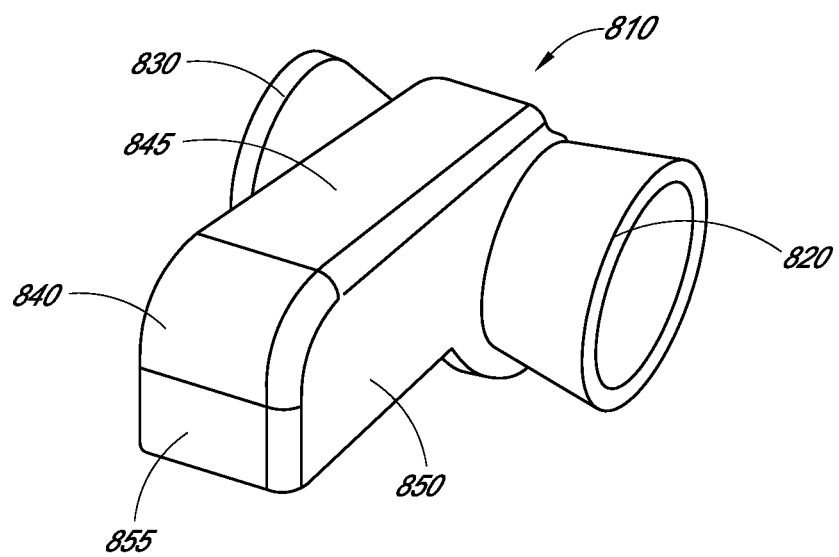
FIG. 8 illustrates an example of a removably attachable optical system that can be placed over a corner of a mobile device.

FIG. 8 illustrates an example of a removably attachable optical system 810 that may be attached to a mobile device at a convergence of two edges or surfaces of the mobile device, such as at a corner. The optical system 810 can include one or more optical components 820, 830 and a retainer portion 840. The retainer portion 840 may include an upper wall 845, a first sidewall 850, a second sidewall (not shown), and an end portion 855.

The first sidewall 850 and second sidewall may be disposed generally parallel to one another and may each be joined at a top edge by the upper wall 845. The plane of the upper wall 845 may be substantially orthogonal to each sidewall. The first sidewall 850 and second sidewall may also be joined by end portion 855 at a second edge. The second edge of each sidewall may converge with the top edge or be generally orthogonal to the top edge of each sidewall. In some embodiments, the upper wall 845 may be curvilinear such that no separate end portion 855 is present. Rather, an extension of the upper wall 845 contacts or joins the sidewalls at the second edge of each sidewall. The optical components 820, 830 may be affixed facing away from one another on opposite sides of the retainer portion 850, each extending outward from one of the sidewalls. For example, as illustrated, optical component 820 may extend generally orthogonally from sidewall 850. In some embodiments, as illustrated, either or both optical components 820, 830 can be positioned on an end region of the retainer portion 840 that is positioned in a location spaced away from and generally opposite from the region of the retainer portion 840 configured to contact a corner portion of a mobile device when attached.

The first and second sidewalls may form a channel in the interior of the retainer portion 840. The width of the channel may be configured to be generally complimentary to the thickness of a portion of the mobile device(s) on which the retainer portion 840 is configured to attach. The retainer portion 840 may be generally configured to be removably attachable to a mobile device such that the channel may fit around a corner of the mobile device and the upper wall 845, the first sidewall 850, the second sidewall, and the end portion 855 (or some combination thereof) each generally contact a surface or edge of the mobile device.

The length of the first sidewall 855 and second sidewall and the positions of the optical components 820, 830 thereon may be chosen such that the optical components 820, 830 generally align with an onboard camera of a mobile device when the optical system 810 is attached to the mobile device. The retainer portion 840 may be configured such that when it is positioned on a mobile device, one of the optical components 820, 830 is positioned in a region generally covering or near an onboard camera lens of the mobile device. Such positioning enables a desired optical component to cooperate optically with the onboard camera. When the retainer portion is positioned such that one of the optical components 820, 830 may be used with the onboard camera, the other optical component 820, 830 is positioned away from the onboard camera. For example, when a first generally planar face of the mobile device includes an onboard camera lens, the second optical component 830 may extend away from a second generally planar face of the mobile device that is general parallel to the first generally planar face of the mobile device. A user may make use of the second optical component 830 by removing the optical system 810 from the mobile device, rotating it into a generally opposite orientation (e.g., rotating it by about 180 degrees, and again placing it on the mobile device such that the second optical component 830 is positioned in a region generally covering or near an onboard camera lens in the mobile device. When so placed, the first optical component 820 is positioned away from the onboard camera and faces outward from the opposite face of the mobile device.

Figure 9:
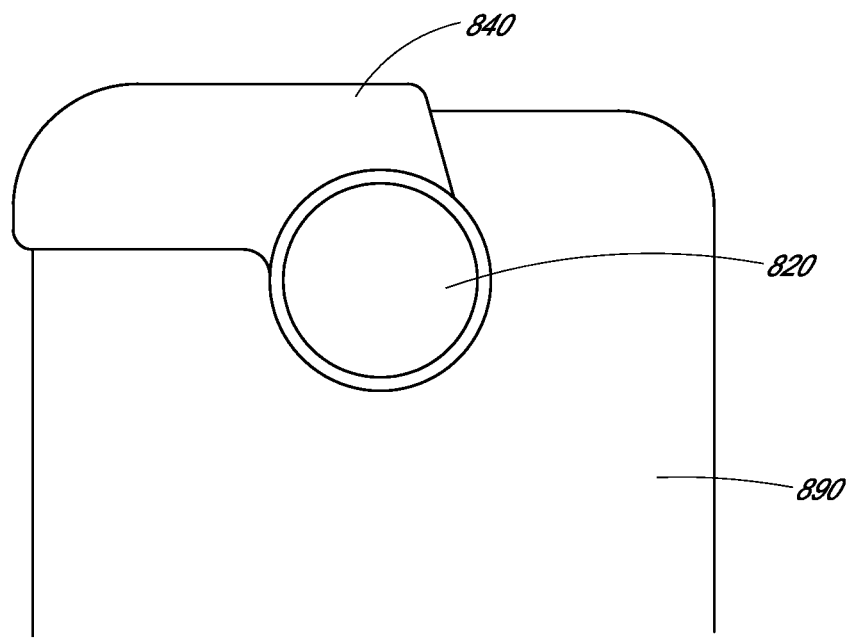
FIG. 9 illustrates an example of a mobile device on which the optical system of FIG. 8 has been attached.

As illustrated in FIG. 9, the optical system 810 of FIG. 8 may be attached to a mobile device 890 in order to use one of the optical components 820, 830. The optical system 810 may be attached to the mobile device 890 in a first position so that optical component 820 is positioned in a region generally covering or near an onboard camera lens in the mobile device 890. While the optical system 810 is in this first position, the other optical component 830 (not shown) is positioned away from the onboard camera, and the retainer portion 840 is in contact with or generally fits around a first corner of the mobile device. A user may move the lens system 810 to a second position (not shown) such that the other optical component 830 is positioned to be used with the onboard camera, and the first optical component 820 is positioned away from the onboard camera. When the optical system 810 is in the second position, the retainer portion 840 may be in contact with or generally fit around a second corner of the mobile device.

In some embodiments, a mobile device may include an onboard camera on each of two generally planar, generally parallel surfaces, such as on both the front and back face. The retainer portion 840 may be configured to generally align an optical component with each onboard camera at the same time, such that a user may benefit from the optical effects and manipulations provided by the optical components via both the front and rear cameras without repositioning or reattaching the optical system 810.

Figure 10:
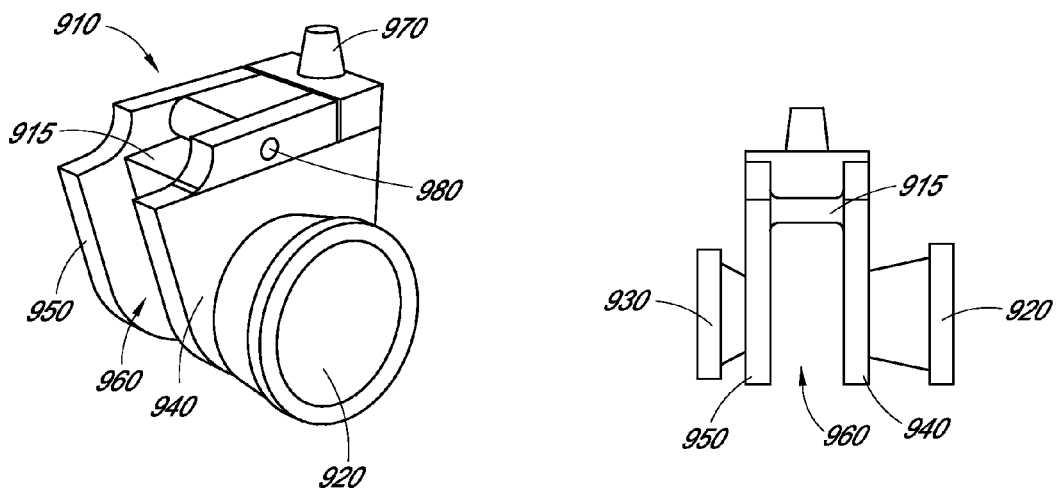
FIG. 10 illustrates an example of an optical system that can be placed over a single edge of a mobile device.

FIG. 10 illustrates an example of a removably attachable optical system 910 that may be placed over a single edge of a mobile device. The optical system 910 may include a retainer portion 915 and one or more optical components, such as optical components 920, 930. The retainer portion 915 may include sidewalls 940, 950. The retainer portion 915 may also include an anchor 970 and a movable portion 980, such as a pivot.

The sidewalls 940, 950 may extend from the retainer portion 915 generally parallel to each other, thereby forming a channel 960. The optical components 920, 930 may be affixed to the outer surfaces of the sidewalls 940, 950 (i.e., extending from the sidewalls in the direction away from the channel 960).

The anchor 970 may be pivotally attached to the retainer portion 915 about the pivot 980. The anchor 970 may generally fit within a functional (e.g., electronic) port or some other opening of a mobile device, such as a headphone jack, microphone jack, USB port, mini USB port, power port, communication port, memory card slot, or the like. When inserted into a port of the mobile device, the anchor 970 can aid in securing the optical system 910 to the mobile device. In some embodiments, the anchor 970 may include pass-through wiring or circuitry, allowing a user to access the port into which the anchor 970 has been inserted. The pass-through circuitry can allow an accessory to electrically communicate with the mobile device via the port. For example, if the port is a headphone jack, a user may insert a headphone plug into an opening of the anchor 970 (not shown), and the headphone plug may communicate with the mobile device via the pass-through circuitry and headphone jack. In addition, insertion of the anchor 970 into a port of a mobile device can ensure proper positing of the optical system 910 (e.g., ensure proper alignment of an optical component with an onboard camera).

The retainer portion 915 may be removably attachable to a mobile device such that the channel 960 may fit around an edge of the mobile device nearest an onboard camera. For example, if a mobile device includes an onboard camera near a top edge, a portion of the mobile device including a portion of the top edge may be inserted into the channel 960. The retainer portion 915 may be configured such that one of the optical components 920, 930 is positioned in a region generally covering or near an onboard camera lens in the mobile device when the retainer portion is attached to the mobile device. When the retainer portion is positioned such that one of the optical components 920, 930 may be used with the onboard camera, the other optical component 930, 920 is positioned away from the onboard camera (e.g., face outward from a opposite side of the mobile device).

Figure 11:
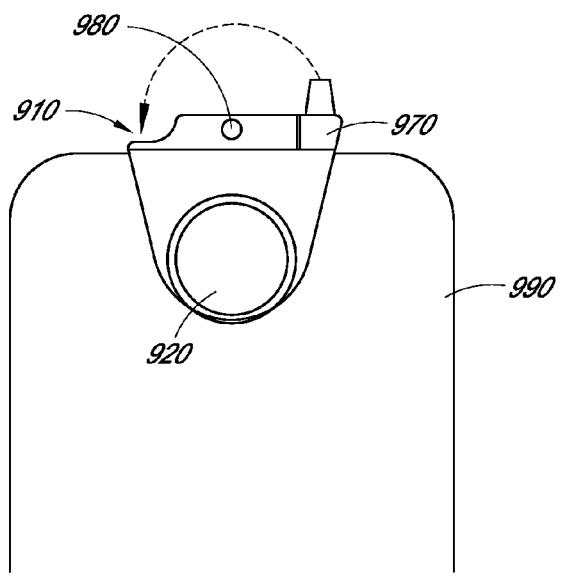
FIG. 11 illustrates an example of a mobile device on which the optical system of FIG. 10 has been attached.

As illustrated in FIG. 11, the optical system 910 of FIG. 10 may be attached to a mobile device 990 in order to use one of the optical components 920, 930. For example, as illustrated, the optical system 910 may be attached to the mobile device 990 in a first position such that optical component 920 is positioned in a region generally covering or near an onboard camera lens in the mobile device 990, thereby enabling the optical component 920 to cooperate optically with the onboard camera. While the optical system 910 is in this first position, the other optical component 930 is positioned away from the onboard camera and faces outward from the opposite side of the mobile device 990. The anchor 970 may be inserted into a port or some other opening of the mobile device to aid in securing the optical system 910 to the mobile device.

A user may make use of a second optical component 930 by removing the optical system 910 from the mobile device 990, rotating it into a generally opposite orientation (e.g., rotating it by about 180 degrees), and again placing it on the mobile device 990 such that the optical component 930 is positioned in a region generally covering or near an onboard camera lens in the mobile device 990. When so placed, the first optical component 920 is positioned away from the onboard camera and faces outward from the opposite side of the mobile device 990. The user may also rotate the anchor 970 about the pivot point 980 from a first position to a second position, thereby facilitating insertion of the anchor 970 into the port of the mobile device 990.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention.

The following is claimed:

1. An optical system configured to be selectively attachable and removable from a mobile electronic device, the optical system comprising:
   a plurality of optical components; and
   a rigid retainer comprising first and second ends, the first and second ends each comprising a hooked portion that is configured to securely receive a portion of an upper edge or a side edge of the mobile electronic device, the retainer configured to receive the plurality of optical components on a first face of the retainer such that a first of the plurality of optical components is positioned at a different location on the first face of the retainer than a second of the plurality of optical components;
   wherein the retainer is configured to removably attach to a mobile electronic device having an onboard camera positioned in a central region of the mobile electronic device, the retainer being configured to position a first of the plurality of optical components in general alignment with the onboard camera, when the first end is attached along an upper edge of the mobile electronic device and the second end is attached along a first lateral edge of the mobile electronic device, and the retainer being configured to position a second of the plurality of optical components in general alignment with the onboard camera, when the second end is attached along an upper edge of the mobile electronic device and the first end is attached along a second lateral edge of the mobile electronic device that is generally opposite from and generally parallel with the first lateral edge of the mobile electronic device.

2. The optical system of claim 1, further comprising the mobile electronic device.

3. The optical system of claim 1, wherein the retainer is configured to be foldable or bendable.

4. The optical system of claim 1, wherein at least one the hooked portions are configured to contact both a front and a rear portion of the mobile electronic device when the optical system is attached to the mobile electronic device.

5. The optical system of claim 4, wherein at least one of the hooked portions comprise a channel that is configured to be complementary in shape to a portion of the mobile device that is received by the channel during attachment of the optical system to the mobile electronic device.

6. The optical system of claim 1, wherein the plurality of optical components comprises one or more of: a telephoto lens; a fish eye lens; a wide angle lens; a lens filter; a polarizing lens; an anti-reflection lens; an anti-glare lens; and a magnifying lens.

7. An optical system configured to removably attach to a mobile electronic device with an onboard camera located in an upper central region of the mobile electronic device, the optical system comprising:
- at least two optical components; and
- a rigid retainer that permits bending when the optical system is attached to the mobile electronic device, the retainer being configured to receive the optical components in different locations on the retainer, the retainer being removably attachable to the mobile electronic device in a first attachment configuration by attaching the retainer to a top edge of the mobile electronic device and by attaching the retainer to a first lateral edge of the mobile electronic device, and in a second configuration by attaching the retainer to the top edge of the mobile electronic device and by attaching the retainer to a second lateral edge of the mobile electronic device that is generally opposite from the first lateral edge of the mobile electronic device;
- wherein in the first and second configurations the retainer is configured not to contact the regions of the mobile electronic device where the top edge of the mobile electronic device and the first lateral edge of the mobile electronic device converge or where the top edge of the mobile electronic device and the second lateral edge of the mobile electronic device converge.

8. The combination of the optical system of claim 7 and the mobile electronic device.

9. The optical system of claim 7, wherein the retainer is configured to receive the at least two optical components at the same time on a surface of the retainer that faces away from the mobile electronic device when the retainer is attached to the mobile electronic device.

10. The optical system of claim 7, wherein at least one of a first end and a second end comprises a hook portion.

11. The optical system of claim 10, wherein at least one of the hook portions are configured to securely receive at least a portion of an edge of the mobile electronic device.

12. The optical system of claim 7, wherein the at least two optical components do not rotate with respect to the retainer.

13. The optical system of claim 7, wherein the retainer comprises a recess configured to receive a raised portion on the mobile electronic device adjacent to an onboard camera of the mobile electronic device.

14. A method of removably attaching an optical system to a mobile electronic device, the method comprising:
- attaching a retainer to a mobile electronic device with an onboard camera of the mobile electronic device located in an upper central region of the mobile electronic device, the retainer comprising at least one hooked portion that extends over an edge of the mobile electronic device and at least two optical components attached or attachable to the retainer at respective different locations on a first side of the retainer at the same time,
- switching the retainer between at least two positions when attached to the mobile electronic device by attaching the retainer and the at least two optical components to a first side of the mobile device in a first orientation, removing the retainer and the at least two optical components from the first side of the mobile electronic device, changing the orientation of the retainer with respect to the mobile device, and reattaching the retainer and the at least two optical components to the first side of the mobile electronic device in a second orientation, without changing the orientation of the optical components with respect to the retainer.

15. The method of claim 14, wherein the optical components do not rotate with respect to the retainer.

16. The method of claim 14, wherein the retainer does not contact any corner region of the mobile electronic device when the optical system is removably attached to the mobile electronic device.

17. The method of claim 14, wherein the retainer attaches to the mobile electronic device using at least two arms.

18. The method of claim 17, wherein at least one of the hooked portions are configured to contact a second side of the mobile electronic device.

19. The method of claim 14, wherein the retainer comprises a recess configured to receive a raised portion on the mobile electronic device adjacent to an onboard camera of the mobile electronic device.

* * * * *

UNITED STATES PATENT AND TRADEMARK OFFICE
CERTIFICATE OF CORRECTION

PATENT NO. : 9,007,522 B1  
APPLICATION NO. : 14/497165  
DATED : April 14, 2015  
INVENTOR(S) : Patrick D. O'Neill Page 1 of 1

It is certified that error appears in the above-identified patent and that said Letters Patent is hereby corrected as shown below:

On The Title Page

In column 2 (page 2, item 56) at line 31, Under Other Publications change "Andriod?";" to --Android?";--.

In The Claims

In column 14 at line 59, In Claim 4, change "one" to --one of--.

Signed and Sealed this  
Twenty-ninth Day of March, 2016

Michelle K. Lee  
*Director of the United States Patent and Trademark Office*